United States Patent [19]
Arsenault et al.

[11] Patent Number: 6,091,324
[45] Date of Patent: Jul. 18, 2000

[54] COMPARING SENSOR OUTPUTS TO DISTINGUISH BETWEEN SENSOR FAULTS AND EXTREME TEMPERATURE CONDITIONS

[75] Inventors: Jeffrey S. Arsenault, Plymouth; Mark David McBroom, Northville; Karienne Ann Yockey, Ann Arbor, all of Mich.

[73] Assignee: Ford Motor Company, Dearborn, Mich.

[21] Appl. No.: 09/191,356

[22] Filed: Nov. 13, 1998

[51] Int. Cl.$^7$ .................................................. B60Q 1/00
[52] U.S. Cl. ........................ 340/449; 340/650; 340/661
[58] Field of Search ..................... 340/449, 501, 340/650, 655, 661, 662, 663, 438; 165/201, 42, 43; 62/126, 127, 228.1, 228.3, 229, 230

[56] References Cited

U.S. PATENT DOCUMENTS

| | | | |
|---|---|---|---|
| 3,863,208 | 1/1975 | Balban | 340/661 |
| 4,363,556 | 12/1982 | Belliveau et al. | 374/183 |
| 4,381,549 | 4/1983 | Stamp et al. | 62/126 |
| 4,441,329 | 4/1984 | Dawley | 62/126 |
| 4,660,386 | 4/1987 | Hansen et al. | 62/126 |
| 5,423,188 | 6/1995 | Neeley | 62/126 |
| 5,482,013 | 1/1996 | Andrews et al. | 123/179.21 |
| 5,549,152 | 8/1996 | Davis, Jr. et al. | 165/201 |
| 5,613,370 | 3/1997 | Pichotta | 62/228.1 |
| 5,697,552 | 12/1997 | McHugh et al. | 236/78 B |
| 5,838,590 | 11/1998 | Shimoyama et al. | 702/130 |

FOREIGN PATENT DOCUMENTS

| | | |
|---|---|---|
| 0 651 237 A1 | 5/1995 | European Pat. Off. . |
| 2 202 344 | 9/1988 | United Kingdom . |
| 2 210 475 | 6/1989 | United Kingdom . |

*Primary Examiner*—Jeffery A. Hofsass
*Assistant Examiner*—Van T. Trieu
*Attorney, Agent, or Firm*—Raymond L. Coppiellie

[57] ABSTRACT

A diagnostic system for detecting when one or more temperature sensors as found in motor vehicle climate control systems are invalid. The system works at extreme temperature conditions and functions to distinguish between sensor faults such as open or short circuits and true sensor temperature readings, which could be, misinterpreted as faulty readings. In particular, combinations of ambient temperature sensors, in-car-temperature sensors and evaporator air temperature sensors are tested by the diagnostic algorithm to make such determinations.

6 Claims, 2 Drawing Sheets

COMPARING SENSOR OUTPUTS TO DISTINGUISH BETWEEN SENSOR FAULTS AND EXTREME TEMPERATURE CONDITIONS

BACKGROUND OF THE INVENTION

1. Field of Invention

This invention relates climate control sensors and more particularly to a method for determining if the output of the sensor is a true sensor fault or as a result of extreme temperature conditions.

2. Prior Art

U.S. Pat. No. 4,660,386 entitled Diagnostic System for Detecting Faulty Sensors in Liquid Chiller Air Conditioning System issued on Apr. 28, 1987 to Hansen et al. measures pressure into an evaporative core and the temperature out of the evaporative core. In this patent, the temperature in the evaporative core is based on the pressure of the refrigerant. The system then compares the temperature into the core with the temperature out of the core and by such comparison, the system will determine if one of the sensors is faulty.

U.S. Pat. No. 5,423,188 entitled Process for Detecting Out-Of-Range Thermistor issued on Jun. 13, 1995 to Neeley measures the ambient temperature and the cooling coil temperature. The system expects the difference between these two sensors to be within a certain range and if outside the range, the system sets an error code.

U.S. Pat. No. 4,381,549 issued on Apr. 26, 1983 to Stamp, Jr. et al. and entitled Automatic Fault Diagnostic Apparatus for a Heat Pump Air Conditioning System measures the temperature both upstream and down stream of a component such as a compressor, heat exchanger, etc. The system uses the measured temperatures to determine if the component is faulty.

U.S. Pat. No. 4,441,329 issued to Dawley on Apr. 10, 1984 and entitled Temperature Control System measures the temperature and sets an alarm if the temperature reading is outside of an expected range.

U.S. Pat. No. 5,549,152, issued on Aug. 27, 1996, and entitled Method and System for Modifying a Linear Control Algorithm Which Controls an Automotive HVAC System to Davis, Jr. et al. and assigned to a common assignee. This patent defines a system that controls a vehicle climate control system with fuzzy logic rather than linear logic.

U.S. Pat. No. 5,613,370 entitled Off-Road Cooling Control issued on Mar. 25, 1997 to Pichotta, discloses a basic vehicle climate control system.

SUMMARY OF THE INVENTION

The prior art as defined above differs from the present invention in that in some of the art the systems do not initially validate the sensor. The systems do not handle the situation when the temperature or pressure are at extremes of the sensor range and continues using sensor readings even at the extremes.

Another of the prior art systems assumes that all the sensors are operational in that it does not check for a faulty sensor. The system uses the sensor, be it operational or faulty, to validate other equipment. It no does not compare one sensor reading against another to determine if the sensors are operational.

Still other prior art systems do not teach any system sensor diagnostics.

The system described in U.S. Pat. No. 5,549,152 is a prior art system used by a common assignee, but does not teach nor suggest the invention herein. It is therefore a principal advantage of the present invention to determine the validity of sensor readings at extreme temperature conditions.

It is still another advantage to check multiple climate control sensors to differentiate an open circuit sensor from a valid sensor.

It is yet another advantage to provide a system wherein the incidents of falsely diagnosing a sensor error are reduced such that the returns of Climate System components as used in motor vehicles are reduced.

These and other advantages are obtained from the method to determine the validity of a temperature sensor in a system having two or more electrical temperature sensors, as may be found in a motor vehicle. First measure the output of the first temperature sensor and generating a first digital signal therefrom representing the measured first temperature. Next measure the output of the second temperature sensor and generating a second digital signal therefrom representing the measured second temperature.

Then compare the first digital signal with a first and second known values respectively representing high (open circuit) and low (short circuit) limit values of the operation environment of the first sensor. Next compare the second digital signal with a third known value representing a low temperature limit value of the second sensor.

Now determine a valid first sensor when either its digital signal is greater than the low limit value (not a short circuit condition) and less than the high limit value (not a open circuit condition). The first sensor is also valid when its digital signal is greater than the high limit value when the second digital signal is greater than the low temperature limit value of the second sensor.

The first sensor can be determined to be an electrically short circuit when its digital signal is less than the low limit value. In addition the first sensor can be determined to be an electrically open circuit when said its digital signal is greater than the high limit value and the digital signal of the second sensor is less than the low temperature limit value of the second sensor.

DETAILED DESCRIPTION OF THE PREFERRED EMBODIMENT

In a motor vehicle, the method and system herein are a strategy that uses information from multiple climate control sensors to distinguish whether sensor readings at extremely cold ambient conditions are true readings. In addition, the method and system determine if the sensor is electrically open circuited and its measured readings should not be used for computing system operating parameters. The method and system tries to eliminate the detection of false climate control sensor failures (which are repeated as diagnostic fault codes) when the sensor is located in extremely cold ambient conditions, <−40° C., which is equivalent to an open circuit reading. A second sensor is measured to determine if the temperature environment of the first sensor is truly an extremely cold ambient condition.

Climate control systems in motor vehicle system applications use many different temperature sensors to provide information as to (i) the exterior or ambient temperature of the vehicle; (ii) the temperature inside of the passenger compartment; and (iii) the temperature inside the HVAC system. The use of algorithms located in the microprocessor based systems or electronic control unit, ECU, provide internal diagnostic functions for sensors to detect if there is an open or short circuit condition in the sensors.

In motor vehicles, these various temperature sensors are typically exposed to a wide range of temperatures, (−50° C. to +105° C.). At this wide temperature range, the temperature accuracy requirements of the system make it difficult if not impossible to provide valid input voltages to the microprocessor at all possible temperature conditions. In prior art systems, extreme temperature conditions are not accounted for and the sensor input values will look like an electrically open or short circuit.

Therefore in the present embodiment, the method and system herein use information from multiple climate control sensors to try and distinguish whether other sensor readings, at extremely cold ambient conditions, are true readings or a sensor failure reading. It is obvious that if the sensor is deemed to have failed, its readings should not be an input to the ECU.

Figure 1:
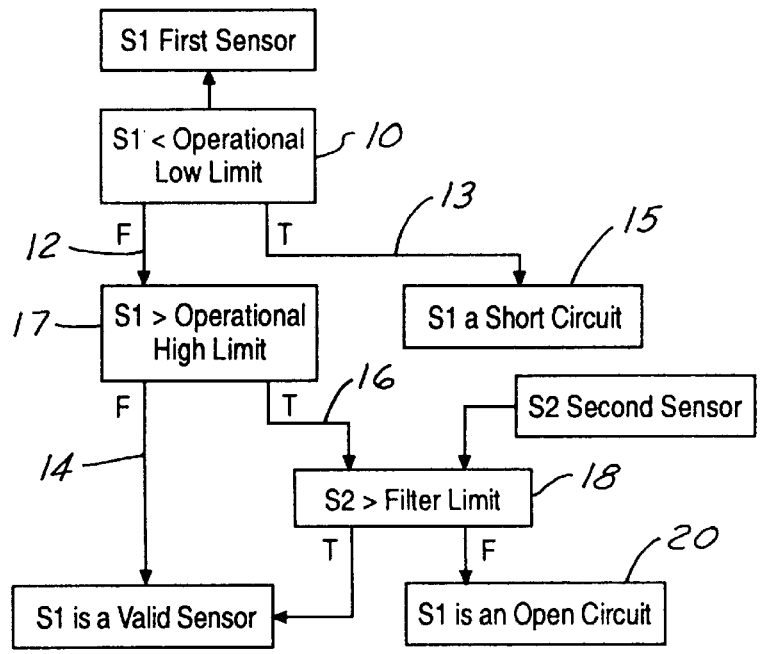
FIG. 1 is a logic flow chart of the preferred embodiment of the invention.

Referring to FIG. 1 there is illustrated a logic flow chart using two different climate control sensors, S1 and S2. In particular each sensor is a temperature sensor that is located in another part of the vehicle wherein the environment of the two sensors, S1, S2, is different even though the temperatures may not.

In the first box 10 the digital value of the voltage output of the first sensor S1 is compared against a known value, operational low voltage limit, which digital value is known to represent an electrical short circuit. This represents a high temperature value, i.e. +105° C. If the digital value of the voltage output is greater than 12 the first known digital value it is known that a short circuit is not present. However, if the digital value of the voltage output is less than 13 the first known digital value, the sensor S1 is a short circuit 15.

Once the determination that the first sensor is not an electrical short circuit, the digital value of the voltage output of the first sensor S1 is compared against a second known value 17, operational high voltage limit, which is a digital value representing an electrical open circuit. This represents a low temperature value, i.e. −50° C. If the value of the first sensor digital output is less than 14 the second known value, it is known that the sensor S1 is functioning or a valid sensor 19.

However, if the value of the voltage output of the first sensor S1 is greater than 16 the second known value, it is necessary to involve a second sensor S2 to determine if the output from the first sensor is an open circuit failure or a true cold temperature condition. The digital voltage output of the second sensor S2 is compared with a third known value 18, filter limit, that is known to be a valid temperature value or filtered value of the second sensor. If the second sensor S2 output voltage is greater than the third known value 18, it is determined that the first sensor S1 voltage output is valid 21.

If the second sensor output voltage is less than the third known value, it is determined 20 that the first sensor voltage output is a true open circuit fault condition.

Figure 2:
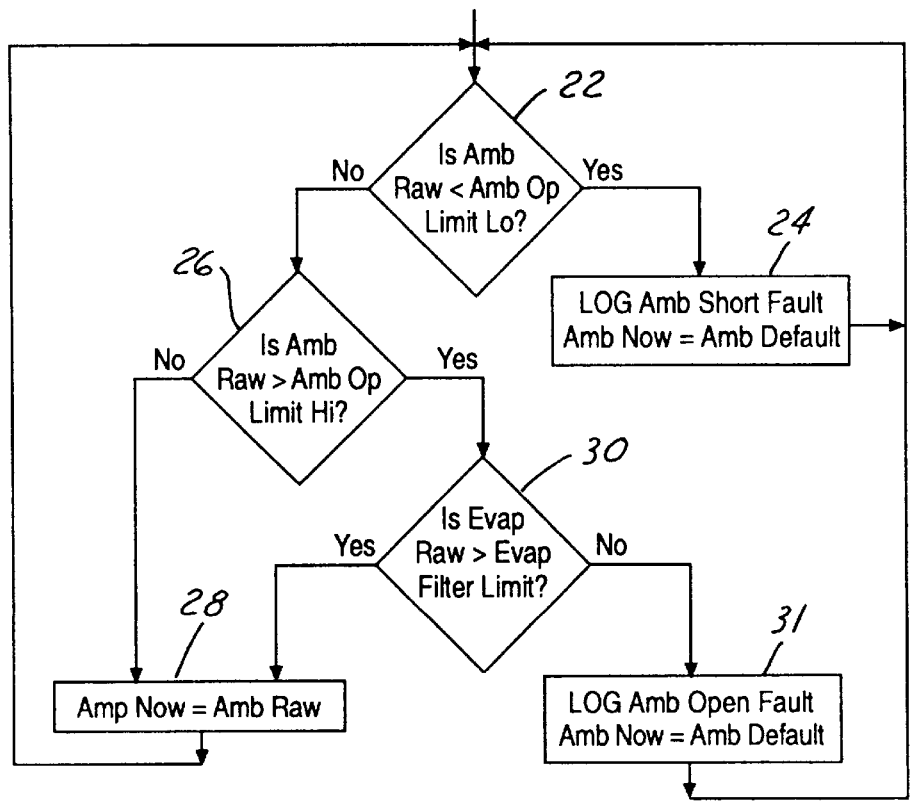
FIG. 2 is a logic flow chart of another embodiment of the invention.

In one embodiment, illustrated in FIG. 2, the first sensor S1 is the Ambient Temperature Sensor, ATS, and is first compared in comparator 22, to determine if its digital output value or Amb Raw or ambient temperature is less than the first known operational low limit Amb Op Limit Lo. If it is then the ATS is assumed to be a short circuit, box 24.

Conversely, if the ATS output value EVap Raw or evaporator temperature is greater than first known operational low limit, EVap Op Limit Lo, it is assumed not to be a short circuit. If its output value or EVap Raw or evaporator temperature is greater than the first known operational limit, it is then compared in comparator 26, with its second known operational high limit or Amb Op Limit Hi that checks for an open circuit condition. If the output value of the ATS is less than the second known operational high limit or EVap Op Limit Hi, it is assumed that the sensor is not an open circuit. Therefore, if the ATS is neither an open nor short circuit, the sensor reading is valid.

The second sensor S2 is only checked if the first sensor S1 reading is greater that an operational high limit value to see if the first sensor S1 is an open circuit condition or a truly cold reading.

However, if the second sensor S2 is the Evaporator Air Temperature Sensor, EVPS, and its output value EVap Raw or evaporator temperature is greater than the low temperature limit value EVap Filter Limit or evaporator low temperature, as compared in comparator 30, then the temperature is assumed to be truly cold and the ATS is assumed to be a valid sensor 28.

However, if the EVPS output is less than the low temperature limit, in Car Op Limit Lo value, the ATS is assumed to be an open circuit, box 31, and therefore not valid.

As an example, the typical temperature range is from −50° C. to +105° C., the corresponding voltage range of a typical vehicle temperature sensor is from zero to five volts over that range. Also the typical outputs from an A/D converter is from zero to two hundred fifty six counts. A short circuit sensor gives a reading of zero volts and zero counts and an open circuit sensor gives a reading of two hundred fifty six counts and five volts. These are design values and not necessarily typical; but are useful for illustration purposes only.

Figure 3:
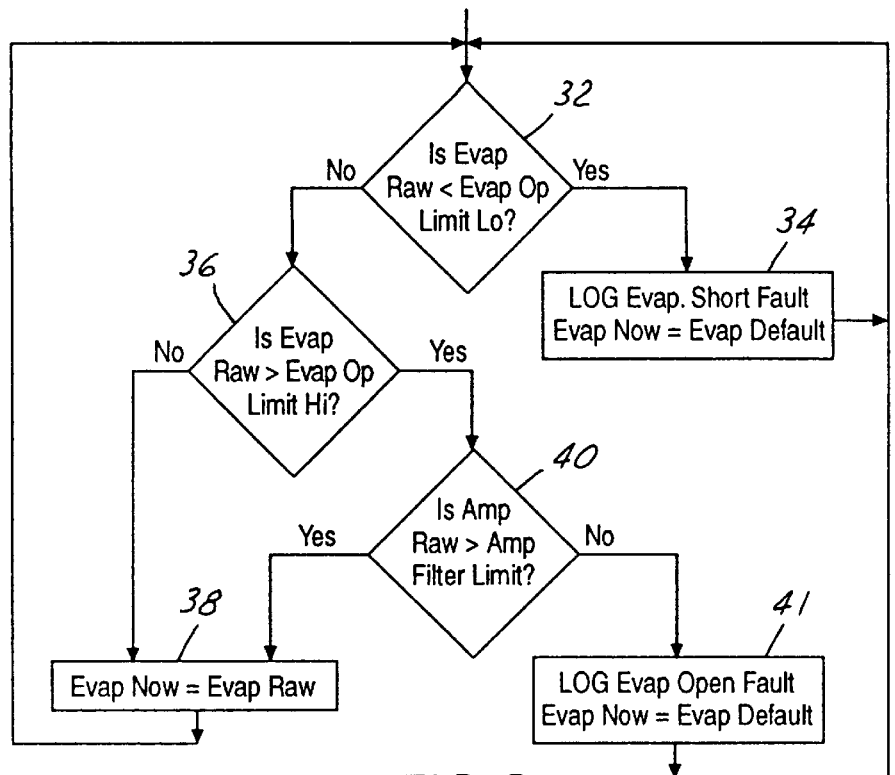
FIG. 3 is a logic flow chart of yet another embodiment of the invention.

In another embodiment, illustrated in FIG. 3, the first sensor S1 is the ZVPS and is first compared in comparator 32 to determine if its digital output value EVap Raw or evaporator temperature is less than the first known operational low limit, EVap Op Limit Lo. If it is, then the EVPS is assumed to be a short circuit, box 34.

Conversely, if the EVPS output value or EVap Raw or evaporator temperature is greater that first known operational low limit, it is assumed not to be a short circuit. If its output value is greater than the first known operational limit, it is then compared in comparator 36, with its second known operational high limit that checks an open circuit condition. If the output value of the EVPS is less than the second known operational high limit, it is assumed that the sensor is not an open circuit. Therefore, if the EVPS is neither an open nor short circuit, the sensor reading is valid, box 38.

However, if the second sensor S2 is the ATS and its output value is greater than the true cold condition, as compared in comparator 40, then the temperature is assumed to be cold and the EVPS is a valid sensor 38.

However, if the ATS output is less than the true cold condition, the EVPS is assumed to be an open circuit, box 41, and therefore not valid.

Figure 4:
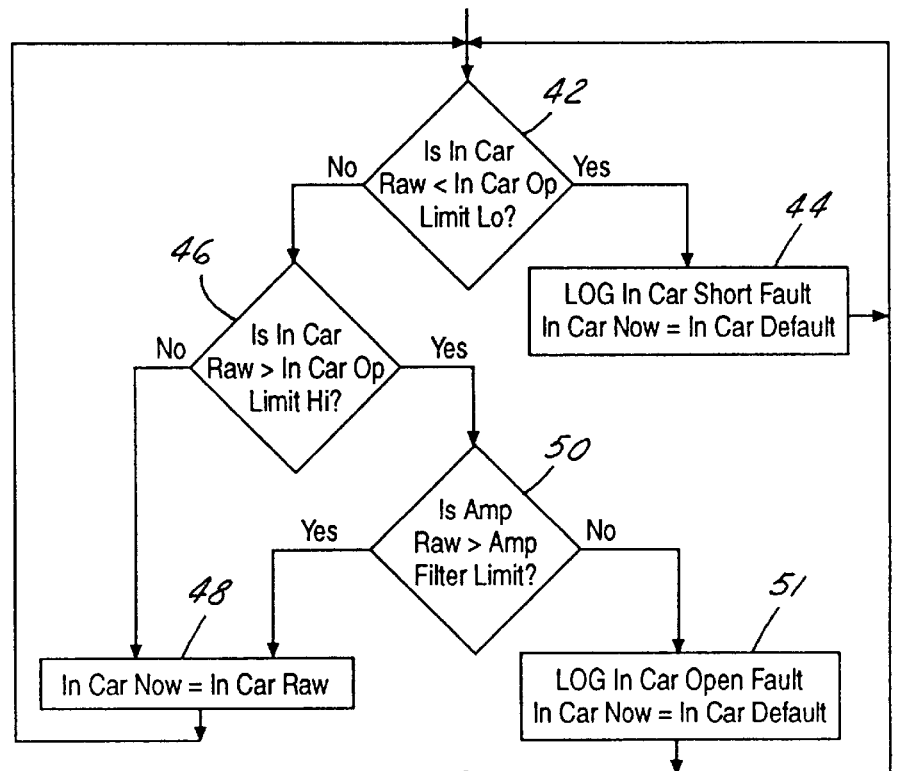
FIG. 4 is a logic flow chart of still another embodiment of the invention.

In an other embodiment, illustrated in FIG. 4, the first sensor S1 is the In-car Temperature Sensor, ICS, and is first compared in comparator 42, to determine if its digital output value in Car Raw or in Car temperature is less than the first known operational low limit in Car Op Limit Lo. If it is, then the ICS is assumed to be a short circuit, box 44.

Conversely, if the ICS output value is greater than the first known operational low limit, it is assumed not to be a short circuit. If its output value is greater than the first known operational limit, it is then compared in comparator 46, with its second known operational high limit or in Car Op Limit Hi that checks for an open circuit condition. If the output value of the ICS is less than the second known operational high limit, it is assumed that the sensor is not an open circuit. Therefore, if the ICS is neither an open nor short circuit, the sensor reading is valid, box 48.

However, if the second sensor S2 is the ATS and its output value is greater than the low temperature limit value Amp Filter Limit, as compared in comparator 50, then the temperature is assumed to be truly cold and the ICS is assumed to be a valid sensor 48.

However, if the 7ATS output is less than the low temperature limit value, the ICS, S2, is assumed to be an open circuit, box 51, and therefore not valid.

In all of the embodiments, when the first sensor S1 is determined to be either open or short, the temperature value of the first sensor S1 for the purposes of the system control reverts to a predetermined default value. In FIG. 2 the temperature value of the ATS, the first sensor, is set to a default temperature value. Likewise in FIG. 3, the temperature value of the EVPS, the first sensor, is set to a default temperature value. Similarly in FIG. 4, the temperature value of the ICS, the first sensor is set to a default temperature. These values are under the control of the system engineer.

There has thus been shown and described a system for determining when a reading of a temperature sensor at an extreme temperature setting is valid or if the sensor input is faulty, it being open circuited or short circuited.

What is claimed is:

1. In a motor vehicle, a system for distinguishing true sensor faults from outputs of sensors at extreme temperature conditions comprising:

a first sensor measuring the ambient air temperature outside of the vehicle and generating a first digital value of a first temperature signal;

a first comparator for comparing said first digital value with a first known value representing a low voltage limit and generating a false first comparator output signal when said first digital value is greater than said first known value and a true first comparator output signal when said first digital value is less than said first known value;

a second comparator for comparing said first digital value with a second known value representing a high voltage limit and generating a false second comparator output signal when said first digital value is less than said second known value and a true second comparator output signal when said first digital value is greater than said second known value;

a second sensor measuring the evaporator air temperature and generating a second digital value of a second temperature signal;

a third comparator for comparing the second digital value with a third known value representing a low temperature limit for said second sensor and generating a true third comparator output signal when said second digital value is greater than said third known value and a false third comparator output signal when said second digital value is less than said third known value;

means for determining said first sensor valid when said first comparator output signal and said second comparator output signals are false or when said first comparator output signal is false, said second and third comparator outputs signal are true; and means for determining said first sensor is an electrically open circuit when said first and third comparator outputs are false and said second comparator output is true and for generating a predetermined digital signal representing said first sensor default value.

2. A system according to claim 1 additionally including means responsive to said true first comparator output signal for determining said first sensor is an electrically short circuit and for generating a digital signal indicating said first sensor default value.

3. In a motor vehicle, a system for distinguishing true sensor faults from outputs of sensors at extreme temperature conditions comprising:

a first sensor measuring the evaporator air temperature and generating a first digital value of a first temperature signal;

a second sensor measuring the ambient air temperature and generating a second digital value of a second temperature signal;

a first comparator for comparing said first digital value with a first known value representing a low voltage limit and generating a false first comparator output signal when said first digital value is greater than said first known value and a true first comparator output signal when said first digital value is less than said first known value;

a second comparator for comparing said first digital value with a second known value representing a high voltage limit and generating a false second comparator output signal when said first digital value is less than said second known value and a true second comparator output signal when said first digital value is greater than said second known value;

a third comparator for comparing the second digital value with a third known value representing a low temperature limit for said second sensor and generating a true third comparator output signal when said second digital value is greater than said third known value and a false third comparator output signal when said second digital value is less than said third known value;

means for determining said first sensor valid when said first comparator output signal and said second comparator output signals are false or when said first comparator output signal is false, said second and third comparator outputs signal are true; and means for determining said first sensor is an electrically open circuit when said first and third comparator outputs are false and said second comparator output is true and for generating a digital signal indicating said first sensor default value.

4. A system according to claim 3 additionally including means responsive to said true first comparator output signal for determining said first sensor is an electrically short circuit and for generating a digital signal indicating said first sensor default value.

5. In a motor vehicle, a system for distinguishing true sensor faults from outputs of sensors at extreme temperature conditions comprising:

a first sensor measuring the in-car air temperature inside of the vehicle and generating a first digital value of a first temperature signal;

a second sensor measuring the ambient air temperature and generating a second digital value of a second temperature signal;

a first comparator for comparing said second digital value with a first known value representing a low voltage limit and generating a false first comparator output signal when said second digital value is greater than said first known value and a true first comparator output signal when said second digital value is less than said first known value;

a second comparator for comparing said second digital value with a second known value representing a high voltage limit and generating a false second comparator output signal when said second digital value is less than said second known value and a true second comparator output signal when said second digital value is greater than said second known value;

a third comparator for comparing the first digital value with a third known value representing a high temperature limit for said first sensor and generating a true third comparator output signal when said first digital value is greater than said third known value and a false third comparator output signal when said first digital value is less than said third known value;

means for determining said second sensor valid when said first comparator output signal and said second comparator output signals are false or when said first comparator output signal is false, said second and third comparator outputs signal are true; and means for determining said first sensor is an electrically open circuit when said first and third comparator outputs are false and said second comparator output is true and for generating a digital signal indicating said first sensor default value.

6. A system according to claim 5 additionally including means responsive to said true first comparator output signal for determining said first sensor is an electrically short circuit and for generating a digital signal indicating said first sensor default value.

* * * * *